K. SMITH.
CHANGE-OVER MECHANISM FOR ELECTRIC RAILWAYS.
APPLICATION FILED MAY 17, 1916.

1,232,864.

Patented July 10, 1917.
2 SHEETS—SHEET 1.

Witness:
P. F. Farrington

Kyle Smith, Inventor
by Albert Scheibe,
Attorney

K. SMITH.
CHANGE-OVER MECHANISM FOR ELECTRIC RAILWAYS.
APPLICATION FILED MAY 17, 1916.
1,232,864.
Patented July 10, 1917.
2 SHEETS—SHEET 2.
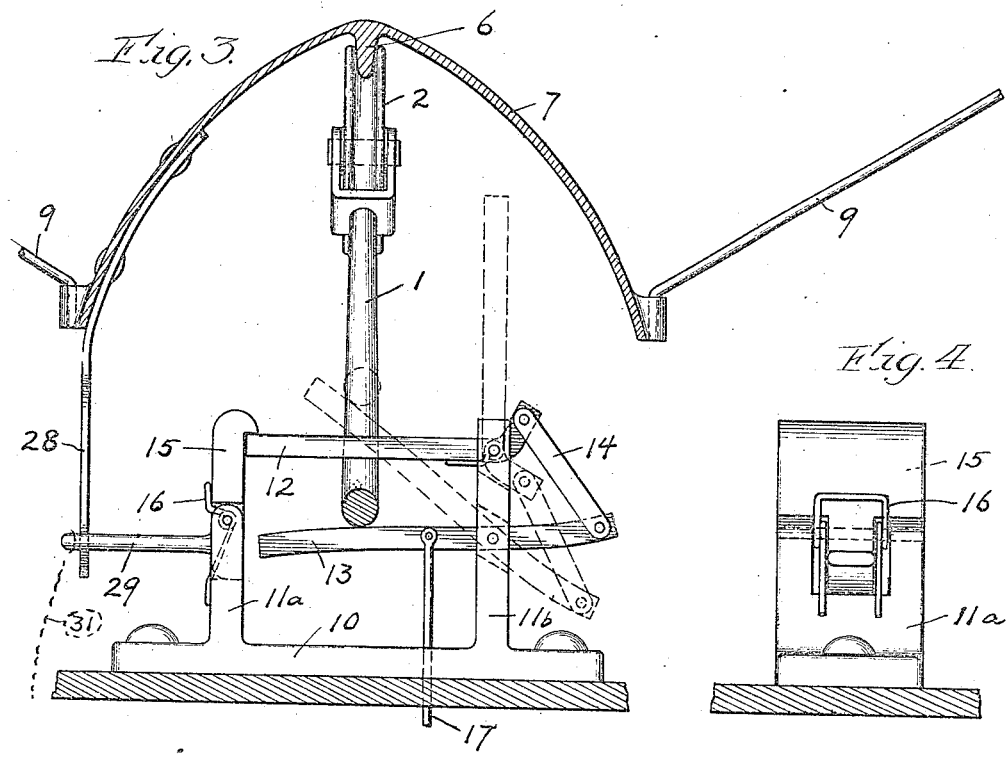
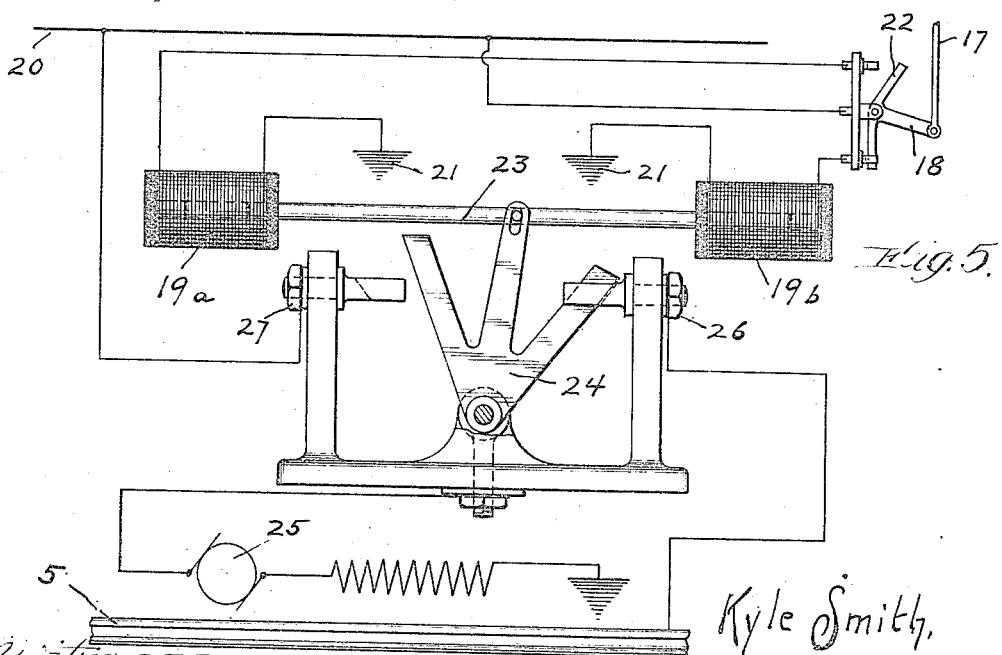
Kyle Smith,
Inventor
by Albert Scheible,
Attorney
Witness:
R. L. Farrington

UNITED STATES PATENT OFFICE.

KYLE SMITH, OF CHICAGO, ILLINOIS.

CHANGE-OVER MECHANISM FOR ELECTRIC RAILWAYS.

1,232,864. Specification of Letters Patent. Patented July 10, 1917.

Application filed May 17, 1916. Serial No. 97,987.

*To all whom it may concern:*

Be it known that I, KYLE SMITH, a citizen of the United States, residing at Chicago, State of Illinois, have invented certain new and useful Improvements in Change-Over Mechanisms for Electric Railways; and I do hereby declare the following to be a full, clear, and exact description of the invention, such as will enable others skilled in the art to which it appertains to make and use the same.

My invention relates to electric railways employing different types of conductors (such as overhead trolleys and third rails) on contiguous sections, its general object being to provide means for automatically changing the trolley from operative to inoperative service when the car passes the junction of such conductors while traveling in one direction or another. With the growth of interurban electric railways, it is becoming more and more customary to use an insulated third rail as one of the current-supply conductors both on rural stretches of road and on elevated lines, while for unelevated sections of the railway within rural limits the third rail is usually forbidden and still has to give place to the overhead trolley. In changing from a trolley section to a third rail section at their juncture, it has heretofore been customary to stop the car (or train if there are several connected cars) after which one of the crew pulls down and secures the trolley pole while another switches the motor connections from the trolley pole and throws another switch connecting the motor with the contact shoe which slides upon the third rail. Equivalent manual operations are required when the car or train passes the juncture of the track sections when going in the opposite direction, thus also involving numerous manual operations and delay due both to the actual stopping time and to the time subsequently required for bringing the car or train up to the usual running speed.

In its general aspects, my invention aims to overcome these delays and to entirely eliminate all manual manipulation during the transition from one track section to the other, thereby enabling the car or train to pass such transition points at a fair rate of speed. More particularly, my invention aims to provide means for automatically depressing the trolley pole and latching the same in a depressed position when the car passes a given point in one direction, and for automatically unlatching and raising the trolley pole when the car passes the same point in a reverse direction; to provide effective guide or guard means for preventing the trolley pole from missing either a latch or the trolley wire when passing the juncture in the respectively opposite directions; to provide simple and effective means coincident with the said latching of the pole for shifting the motor connections from the trolley pole to the sliding shoe, and means coincident with the unlatching of the trolley pole for reversing the said shifting of the connections. Still more particularly, my invention aims to provide an electric switch controlled by the latching and unlatching of the trolley pole, and to provide electromagnetic switching means subject to the said switch for shifting the motor connections from the trolley to the sliding shoe and vice versa. Further objects will appear from the following specification from the accompanying drawings, in which—

Fig. 3 is an enlarged transverse section through the trolley-pole-catcher on the top of the car of Fig. 2 and the parts adjacent thereto.

Fig. 4 is a side elevation of the catch of the latching mechanism of Fig. 3.

Fig. 5 is a partially diagrammatic view showing the circuit connections of the magnetic switch for controlling the motor connections.

Figure 1:
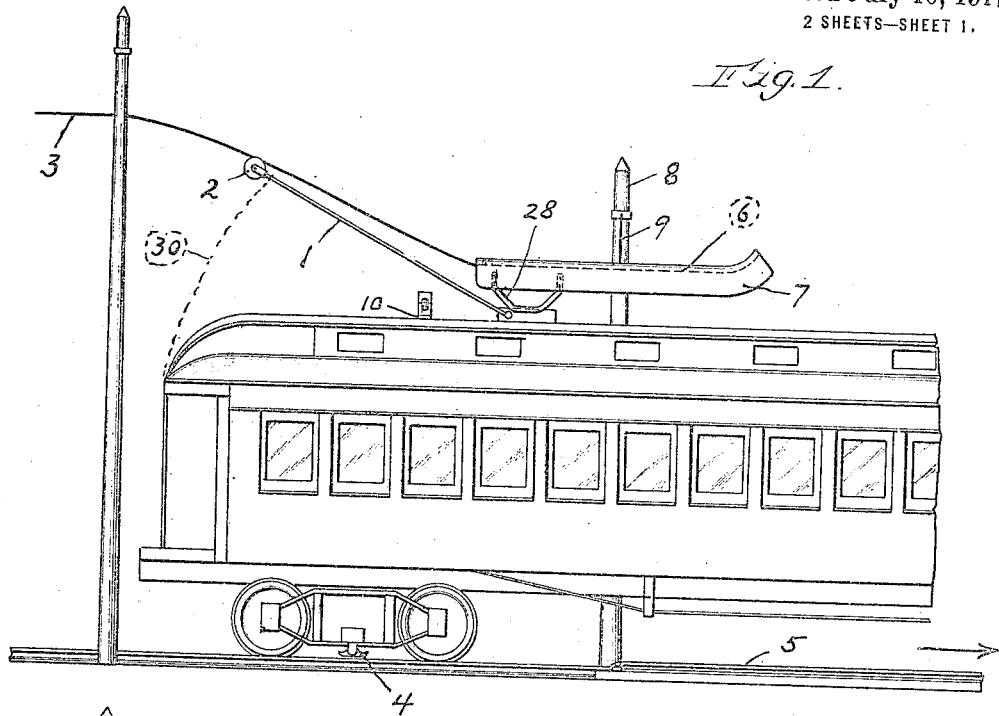
Figure 1 is a fragmentary elevation of a car about to pass from an overhead trolley section to a third rail track section.
Figure 2:
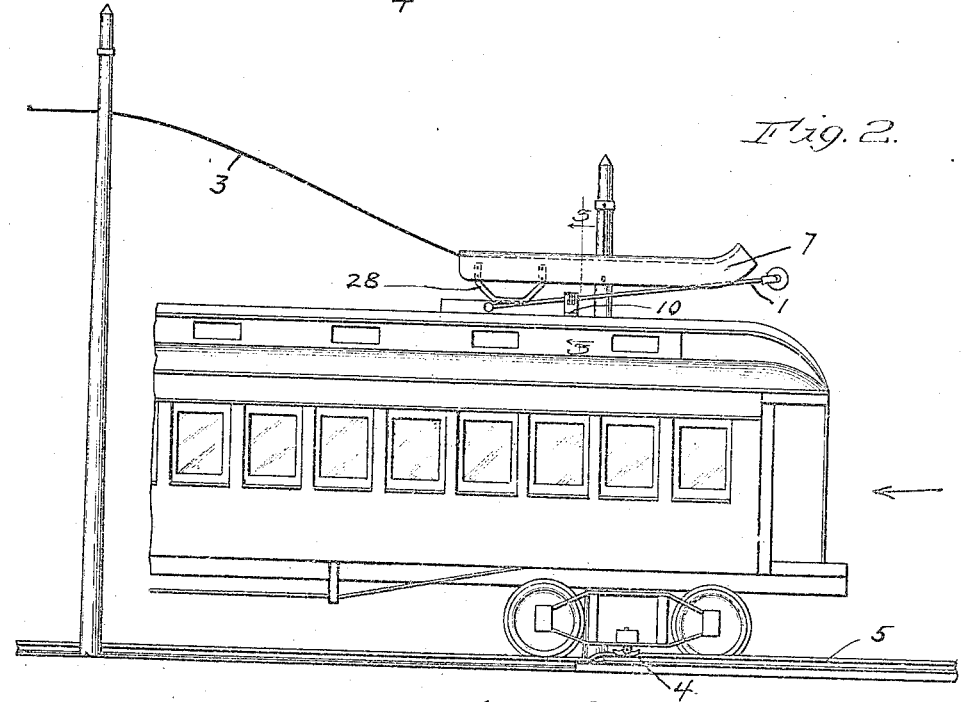
Fig. 2 is a similar fragmentary view of a car going in the opposite direction.

In the drawings, my invention is shown as used in connection with a car having at its top a trolley pole 1 carrying a wheel 2 adapted to contact with a trolley wire 3, and having at its side a shoe 4 adapted to slide upon a third rail 5. Adjacent to the juncture of the track sections for which the operating current is supplied respectively by the said trolley wire and third rail, the trolley wire is depressed (as shown in Figs. 1 and 2) and merged into a rib 6 formed within the ridge of a guard-trough 7 suspended from poles 8 by wires 9, this trough being at such a height that the passage of the trolley wheel under it will bring the trolley pole almost down upon the roof of the car. Mounted on the top of the car rearwardly of the base of the trolley pole is a standard 10 having a pair of uprights 11, one of which carries two pivoted arms 12 and 13 extending toward the other upright and connected at their rear ends by a link 14.

The standard 10 is placed axially of the car so that the trolley pole 1 when depressed will strike the lower arm 13 (which is normally in the position shown in dotted lines in Fig. 3), thereby forcing this arm downward and, through the medium of the link 14, carrying the other arm 12, from a normal substantially vertical position to a horizontal position. When brought to this latter position, the tip of the arm 12 snaps under the hook end of a catch 15 pivoted on the arm 11ª, which catch is continuously forced toward the other arm 11 by a spring 16. As soon as the arm 12 is thus latched in position, this arm will act as a stop to prevent the trolley pole 1 from being raised by the usual spring attached to the base of this pole, hence the latter will be kept in a depressed position substantially as shown in Fig. 2.

Connected to the lower pivoted arm 13 is a link 17 of a switch 22 which latter is arranged for connecting either of two alined solenoids 19ª and 19ᵇ between a connector 20 leading to the trolley wheel and grounds 21. When the link 17 is depressed by the depressing of the trolley arm, the said switch 22 closes the circuit through the right hand solenoid 19ᵇ, thereby causing the latter to draw the common core 23, of the two solenoids to the right. When so drawn, the core 23 moves a pivoted switch 24 as shown in Fig. 5, thereby contacting with the right hand terminal 26 and connecting the motor 25 with the third rail 5. Thus the passing of the trolley pole under the guide trough 7 (with the car going toward the right in Fig. 1) automatically latches the trolley pole in a depressed position, connects the motor to an energized rail and disconnects the motor from the left hand terminal 27 which leads to the trolley circuit.

Depending at one side from the trough 7 is a trip 28 which is so positioned as to engage an arm 29 on the catch 15, thereby depressing this arm and unlatching the catch when the car passes under the trough in the reverse direction, as shown in Fig. 2. As soon as the catch 15 is released, the trolley pole 1 will be forced upward by its usual spring (not shown in the drawings) and will force the trolley wheel against the rib 6, thus connecting the left hand terminal 27, to the trolley circuit. In thus snapping upward, the trolley pole will carry the upper pivoted arm 12 ahead of it, and owing to the link 14, the lower link 13 will be raised also. The latter in turn, through the link 17 will raise the switch lever 18, thereby changing the circuit connections to the left hand solenoid and causing the latter to draw the core toward the left, so as to switch the motor circuit from the third rail connection to the trolley-wire connection.

It will be obvious from the above that no manual effort or attention will be required with the car going in either direction, either for depressing or raising the trolley or for switching the circuit connections. Moreover, the few and simple overhead parts as well as the switch parts can easily be built in such rugged form as to withstand the strains due to operation at considerable speed. So also, it will be evident that the trough 7 will serve as a guide for alining the trolley with the rib 6 and hence with the trolley wire in case any swaying of the car or other cause should permit the trolley pole to be raised at one side of the desired alinement. However, while I have shown the trolley wire as terminating in an inwardly ribbed trough, and the motor circuit switch as controlled by solenoids having a common core I do not wish to be limited to these or other details of what I have here disclosed, it being evident that both the construction and the arrangement might be modified in many ways without departing from the spirit of my invention. For example, where lines diverge, a manually actuated trolley rope might be used in place of the lowered guide and the sloping end of the trolley wire for depressing the trolley pole (as shown by dotted line at 30 in Fig. 1) in which case the mere pulling of this rope 30 would both latch the trolley arm in its depressed position and actuate the switching mechanism. Likewise, the catch 15 might be released on the return trip by a companion rope 31 (Fig. 3) thereby actuating the switching mechanism in the opposite direction.

So also, it will be obvious that the use of my invention entirely obviates the necessity of stopping and starting the car or train at such section points, thereby utilizing the momentum otherwise spent in the braking, saving the energy required for the restarting, and also saving wear on all parts of the braking apparatus.

I claim as my invention:

1. In an electric railway system having adjoining sections, the combination with a car, of a trolley pole, latching means carried by the car and operated by a depressing of said pole for retaining the latter in a depressed position, and switching means responsive to the position of the latching means.

2. In a trolley car, the combination with a trolley pole, of a latch for retaining the pole in a depressed position, circuit-switching means, an element movable with respect to the car and moved by the pole when the latter is depressed, and means connected to said element for operating both the latch and the switching means.

3. In a trolley car, the combination with a trolley pole, of latching means for retaining the latter in a depressed position; said latching means including a pair of pivoted arms between which the pole is disposed when thus retained, an element connecting said arms, and means for locking one of said arms.

4. In a trolley car, the combination with a trolley pole and circuit-switching means, of latching means for retaining the pole in a depressed position, said latching means including a pivoted arm connected to the circuit-switching means and engaged by the pole when the latter is being depressed.

5. In a trolley car, the combination with a trolley pole, of a latch for retaining the pole in a depressed position, latch-operating means responsive to the position of the trolley pole, and circuit-switching means responsive in position to the latch-operating means.

6. In an electric car, a motor, a plurality of supply circuits for the motor, a contact member movable with respect to the car and associated with one of said circuits for conveying current from a stationary conductor, a latch for holding said member out of contact with said conductor, latch-operating means responsive to the position of said member, and switching means controlled by the latch-operating means and controlling the said circuits.

7. In an electric car, a trolley pole, a sliding contact shoe, motor circuits leading respectively to said pole and shoe, latching means responsive to the position of the trolley pole, and switching means controlling said circuits and responsive to the latching means.

8. In an electric car, a trolley pole, a sliding contact shoe, motor circuits leading respectively to said pole and shoe, latching means responsive to the position of the trolley pole, and electromagnetic switching means in circuit with the trolley and controlling said motor circuits, said switching means being responsive to the latching means.

9. In an electric railway system having adjoining sections for which current is supplied respectively by two different types of conductors, a car, contact members carried by the car and adapted respectively to contact with said conductors, motor circuits leading respectively to said contact members, means for moving one of said members with respect to the car when the latter is passing the juncture of said track sections, latching means for holding the last named member in a predetermined position, and switching means responsive to the latching means and controlling said circuits.

10. In an electric railway system having adjoining sections for which current is supplied respectively by a trolley wire and a third rail, the combination with a car, of a contact shoe adapted to engage the third rail, a trolley pole, motor circuits associated respectively with said pole and shoe, latching means for holding the trolley pole in a given position, and switching means controlling said circuits, the switching means being controlled by said latching means.

11. In an electric railway system having adjoining sections for which current is supplied respectively by a trolley wire and a third rail, the combination with a car, of a contact shoe adapted to engage the third rail, a trolley pole, circuit-switching means controlled by said pole and controlling the connection of the motor to the pole and shoe respectively, latching means operated by a depressing of said pole for retaining the latter in a depressed position, and stationary means disposed adjacent to the juncture of said sections and arranged for releasing said latching means.

12. In an electric railway system having adjoining sections, the combination with a car, of a trolley pole, latching means carried by the car and operated by a depressing of said pole for retaining the latter in a depressed position, and means disposed adjacent to the juncture of said sections, and arranged for releasing said latching means.

13. In a trolley car, the combination with a trolley pole, of a latching bar arranged for retaining the pole in a depressed position, a detent for the latching bar, circuit-switching means, and common means operated by the depressing of the trolley pole for moving the latching bar into its pole-retaining position and for actuating said switching means.

14. In an electric railway system, the combination with a car, of a trolley pole, a pair of pivoted arms between which the trolley pole is adapted to move when the pole is depressed, an element connecting said arms, a detent for locking one of said arms, and stationary means for releasing said detent, said stationary means being positioned for engaging said detent when the car is passing a given point.

15. In an electric railway system, the combination with a car, of a trolley pole, a pair of pivoted arms between which the trolley pole is adapted to move when the pole is depressed, an element connecting said arms, a detent for locking one of said arms, a trip arm on said detent, and stationary means positioned for engaging said trip arm when the car is passing a given point.

KYLE SMITH.

Copies of this patent may be obtained for five cents each, by addressing the "Commissioner of Patents, Washington, D. C."